US009103492B2

(12) United States Patent
Springer et al.

(10) Patent No.: US 9,103,492 B2
(45) Date of Patent: Aug. 11, 2015

(54) ADJUSTABLE HOLDER FOR DEVICES

(71) Applicant: Stand For Stuff LLC, Seattle, WA (US)

(72) Inventors: Martin A. Springer, Seattle, WA (US); Matthew L Arksey, Seattle, WA (US); Jedediah J McCann, Seattle, WA (US); Jake Levine, Seattle, WA (US)

(73) Assignee: Stand For Stuff LLC, Seattle, WA (US)

( * ) Notice: Subject to any disclaimer, the term of this patent is extended or adjusted under 35 U.S.C. 154(b) by 188 days.

(21) Appl. No.: 13/783,044

(22) Filed: Mar. 1, 2013

(65) Prior Publication Data

US 2014/0246551 A1    Sep. 4, 2014

(51) Int. Cl.
| A47B 91/00 | (2006.01) |
| A47G 29/00 | (2006.01) |
| B65D 19/00 | (2006.01) |
| F16M 11/04 | (2006.01) |
| F16M 11/14 | (2006.01) |
| F16M 11/20 | (2006.01) |
| F16M 11/22 | (2006.01) |
| F16M 13/02 | (2006.01) |

(52) U.S. Cl.
CPC .............. *F16M 11/041* (2013.01); *F16M 11/14* (2013.01); *F16M 11/2021* (2013.01); *F16M 11/22* (2013.01); *F16M 13/022* (2013.01)

(58) Field of Classification Search
CPC ..................................................... B60R 13/105
USPC ........ 248/689, 447.1, 447.2, 450, 451, 475.1, 248/476, 479, 480, 481, 488, 490, 495, 496, 248/121, 124.1, 124.2, 220.21, 292.12, 248/220.22, 229.14, 229.22, 229.24, 248/346.03, 346.06, 346.07, 346.5; 361/679.55, 679.56, 679.58; 269/43, 3, 269/6, 95, 143, 249

See application file for complete search history.

(56) References Cited

U.S. PATENT DOCUMENTS

| 259,351 | A | * | 6/1882 | Ayer | 269/90 |
| 5,630,566 | A | | 5/1997 | Case | |
| 5,660,361 | A | * | 8/1997 | Penger | 248/131 |
| 6,315,252 | B1 | | 11/2001 | Schultz | |
| 6,470,809 | B1 | | 10/2002 | Herbert | |
| 7,611,112 | B2 | * | 11/2009 | Lin | 248/274.1 |
| 7,922,137 | B2 | | 4/2011 | Derry et al. | |
| 7,984,886 | B2 | * | 7/2011 | Lin | 248/181.1 |
| 8,070,123 | B2 | * | 12/2011 | Yu | 248/346.06 |
| 8,136,780 | B2 | * | 3/2012 | Lin | 248/316.4 |
| 8,235,334 | B1 | * | 8/2012 | Kobal | 248/122.1 |
| 8,240,628 | B2 | * | 8/2012 | Huang | 248/316.1 |
| 8,262,070 | B2 | * | 9/2012 | Liu | 269/254 R |
| 8,413,943 | B1 | * | 4/2013 | Li | 248/454 |
| 8,496,144 | B2 | * | 7/2013 | Son | 224/276 |

(Continued)

*Primary Examiner* — Terrell McKinnon
*Assistant Examiner* — Michael McDuffie
(74) *Attorney, Agent, or Firm* — Lee & Hayes, PLLC

(57) ABSTRACT

Disclosed is an adjustable holder for devices with a simplified design for accommodating devices of various form factors and shapes. The adjustable holder comprises at least a pair of offset, generally parallel arms that are slidable within corresponding openings of a support in order to adjust the arms and fixedly position the arms at varying distances relative to the support. The adjustable holder further comprises a gripping member coupled to a distal end of each of the arms to grip a device at opposing sides of the device. In some embodiments, the arms are adjustable via a two-part ratcheting mechanism. In yet other embodiments, the gripping members are rotatable to accommodate devices of various geometries. The holder can fit onto a stand or structure to hold a device in a fixed position.

20 Claims, 10 Drawing Sheets

(56) References Cited

U.S. PATENT DOCUMENTS

| | | |
|---|---|---|
| 8,505,790 B2 * | 8/2013 | Yu et al. .................. 224/185 |
| 8,505,892 B2 * | 8/2013 | Seidel ..................... 269/46 |
| 8,638,557 B2 * | 1/2014 | Tsai ........................ 361/679.56 |
| 8,745,832 B2 * | 6/2014 | Barrios et al. ............. 29/245 |
| 8,833,716 B2 * | 9/2014 | Funk et al. ............... 248/316.4 |
| 2005/0077448 A1 | 4/2005 | Rossini |
| 2009/0032481 A1 * | 2/2009 | Stukenberg ............. 211/41.7 |
| 2009/0294617 A1 | 12/2009 | Stacey et al. |
| 2010/0072334 A1 | 3/2010 | Le Gette et al. |
| 2010/0108828 A1 * | 5/2010 | Yu et al. .................. 248/123.11 |
| 2010/0294908 A1 * | 11/2010 | Mish et al. ............... 248/451 |
| 2011/0062299 A1 * | 3/2011 | Tsai ........................ 248/231.41 |
| 2011/0253855 A1 * | 10/2011 | Yu ........................... 248/222.14 |
| 2012/0026684 A1 * | 2/2012 | Matthews ................ 361/679.58 |
| 2012/0080577 A1 * | 4/2012 | McIntyre et al. ........ 248/346.04 |
| 2012/0091307 A1 * | 4/2012 | Haynes .................... 248/451 |
| 2012/0170212 A1 | 7/2012 | Gallouzi et al. |
| 2012/0175474 A1 * | 7/2012 | Barnard et al. .......... 248/122.1 |
| 2012/0205503 A1 | 8/2012 | Kobal |
| 2012/0235001 A1 | 9/2012 | Somuah |
| 2012/0241572 A1 | 9/2012 | McClain et al. |
| 2012/0257345 A1 | 10/2012 | Hulet |
| 2012/0257346 A1 | 10/2012 | Hulet |

* cited by examiner

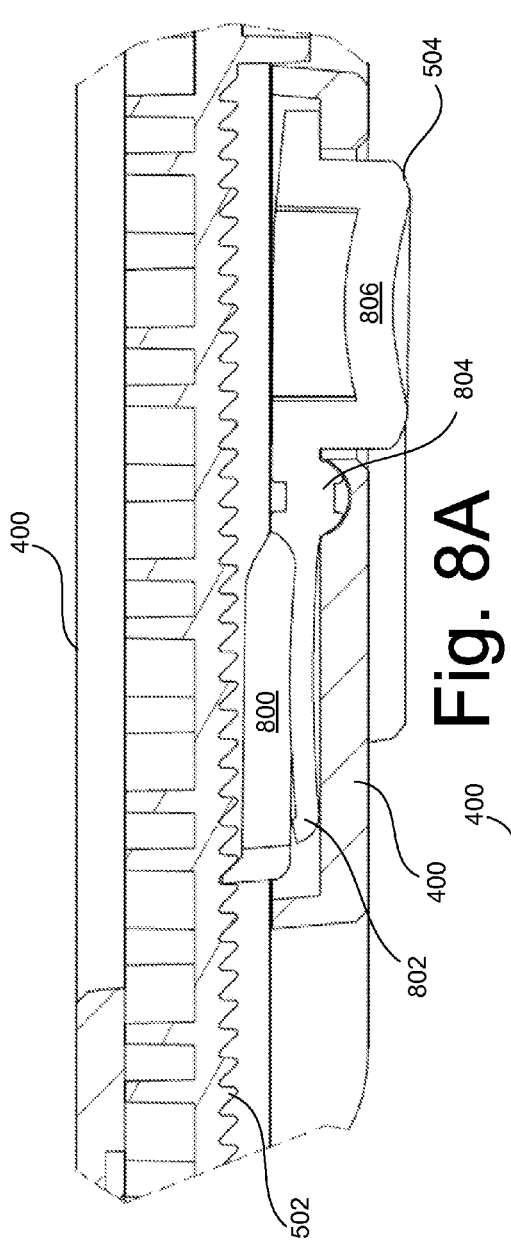
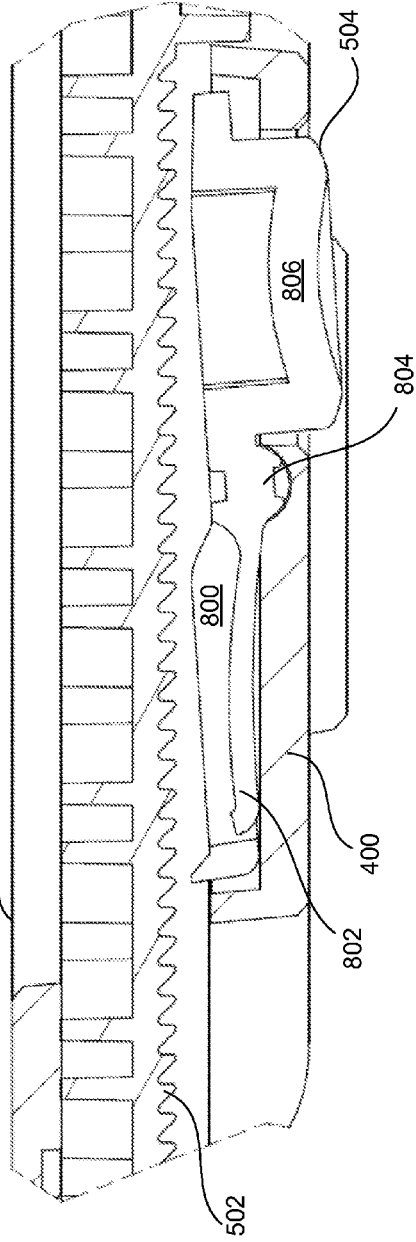

ADJUSTABLE HOLDER FOR DEVICES

BACKGROUND

1. Field of the Invention

The present invention relates generally to adjustable holders and stands for items, and in particular, to an adjustable holder for accommodating and holding devices having different form factors and shapes.

2. Description of the Related Art

The proliferation of devices such as tablet computers ("tablets"), electronic readers ("e-readers"), smart phones, and similar devices, has resulted in an ever increasing number of users that use these devices in various settings. Conventional use of these devices involves supporting the device by some means (e.g., a table, one of the user's hands, etc.), while operating the device with one or both of the user's hands. That is, outside of non-tactile-based user input mechanisms like voice commands, at least one of the user's hands must remain free to operate the device via some type of tactile-based user input mechanism (e.g., a touch screen, physical buttons, etc.).

However, user's often desire to use their devices in a "hands-free" mode such as in settings where they cannot, or desire not to, use one of their hands to support the device. For example, tablets have become well known for their use in providing access to an abundance of musical literature such as electronic sheet music for musicians to read while performing a song. In such a scenario, the musician cannot afford to use one hand to support the device, leaving only one hand to play a musical instrument. Other example settings where hands-free use of a device is needed/desired may be contemplated (e.g., using the device in bed, while using a stationary exercise machine, etc.).

Accordingly, specialty holders have been designed to enable users to operate their device "hands-free" (i.e., without the use of any hands to support the device). Such specialty holders are often complex in design and use. Additionally, they are often prone to mechanical failure, and only accommodate one type of device of a particular rectangular geometry.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Accordingly, disclosed herein is an adjustable holder of a simplified design for accommodating devices of various form factors. The adjustable holder comprises a pair of offset, generally parallel arms that are slidable within openings of a support in order to adjust the arms for securely holding a device therein.

In some embodiments, the adjustable holder comprises a support including at least two openings disposed on opposing sides of the support, at least two adjustable arms in sliding engagement within corresponding ones of the at least two openings, and a gripping member coupled to a distal end of each of the at least two adjustable arms to grip a device at opposing sides of the device. The at least two adjustable arms may be generally L-shaped and oriented generally parallel and flat on a common plane, and each of the at least two adjustable arms may be offset from the other on the common plane in a direction transverse to a direction of the sliding engagement. Furthermore, the gripping member may be rotatable about an axis perpendicular to the common plane to accommodate devices of various geometries.

In some embodiments, the adjustable holder comprises a support including at least two openings disposed on opposing sides of the support, at least two arms in sliding engagement within corresponding ones of the at least two openings, and a gripping member coupled to a distal end of each of the at least two arms to grip a device at opposing sides of the device. Each of the at least two arms may comprise a first ratcheting mechanism of a two-part ratcheting mechanism configured to enable adjustable translation of either of the at least two arms relative to the support, and the adjustable holder may further comprise a second ratcheting mechanism of the two-part ratcheting mechanism disposed within the support and configured to releasably engage the first ratcheting mechanism to enable the adjustable translation of either of the at least two arms relative to the support.

In some embodiments, the adjustable holder comprises a means for supporting a device including at least two openings disposed on opposing sides of the means for supporting, at least two means for expanding the adjustable holder in sliding engagement within corresponding ones of the at least two openings, and a means for gripping the device coupled to a distal end of each of the at least two means for expanding, the means for gripping configured to grip the device at opposing sides of the device. Each of the at least two means for expanding may comprise a plurality of teeth configured to enable adjustable translation of either of the at least two means for expanding relative to the means for supporting. The adjustable holder may further comprise at least two means for selectively securing the at least two means for expanding, the at least two means for selectively securing disposed within the means for supporting and biased in position to engage the teeth of corresponding ones of the at least two means for expanding, each of the at least two means for selectively securing being configured to disengage the teeth of the corresponding means for expanding to enable the adjustable translation of the corresponding means for expanding.

Embodiments of the adjustable holder disclosed herein are of a simplified design, reducing both the possibility of mechanical failure of the adjustable holder, and expenses related to manufacturing the adjustable holder. The embodiments disclosed herein facilitate simple operation of the adjustable holder for holding a device therein and using the device in a "hands-free" mode. The adjustable features of the embodiments disclosed herein allow for accommodating devices of various form factors across varying types of devices, or different form factors for the same type of device (e.g., tablets of various shapes, rectangular geometries, etc.). Furthermore, the embodiments disclosed herein accomplish a wide range of adjustable parameters without compromising stability and integrity in securely holding a device therein, allowing for improved versatility in the use of devices for end users.

Other features and advantages of the present invention will become apparent from the following description of the invention, which refers to the accompanying drawings.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 8A illustrates a close-up of the side, cross-sectional view of the adjustable holder of FIG. 7B with one part of the two-part ratcheting mechanism in an engaged/biased position;

FIG. 8B illustrates a close-up of the side, cross-sectional view of the adjustable holder of FIG. 7B with the one part of the two-part ratcheting mechanism in a released/actuated position.

DETAILED DESCRIPTION

Figure 1A:
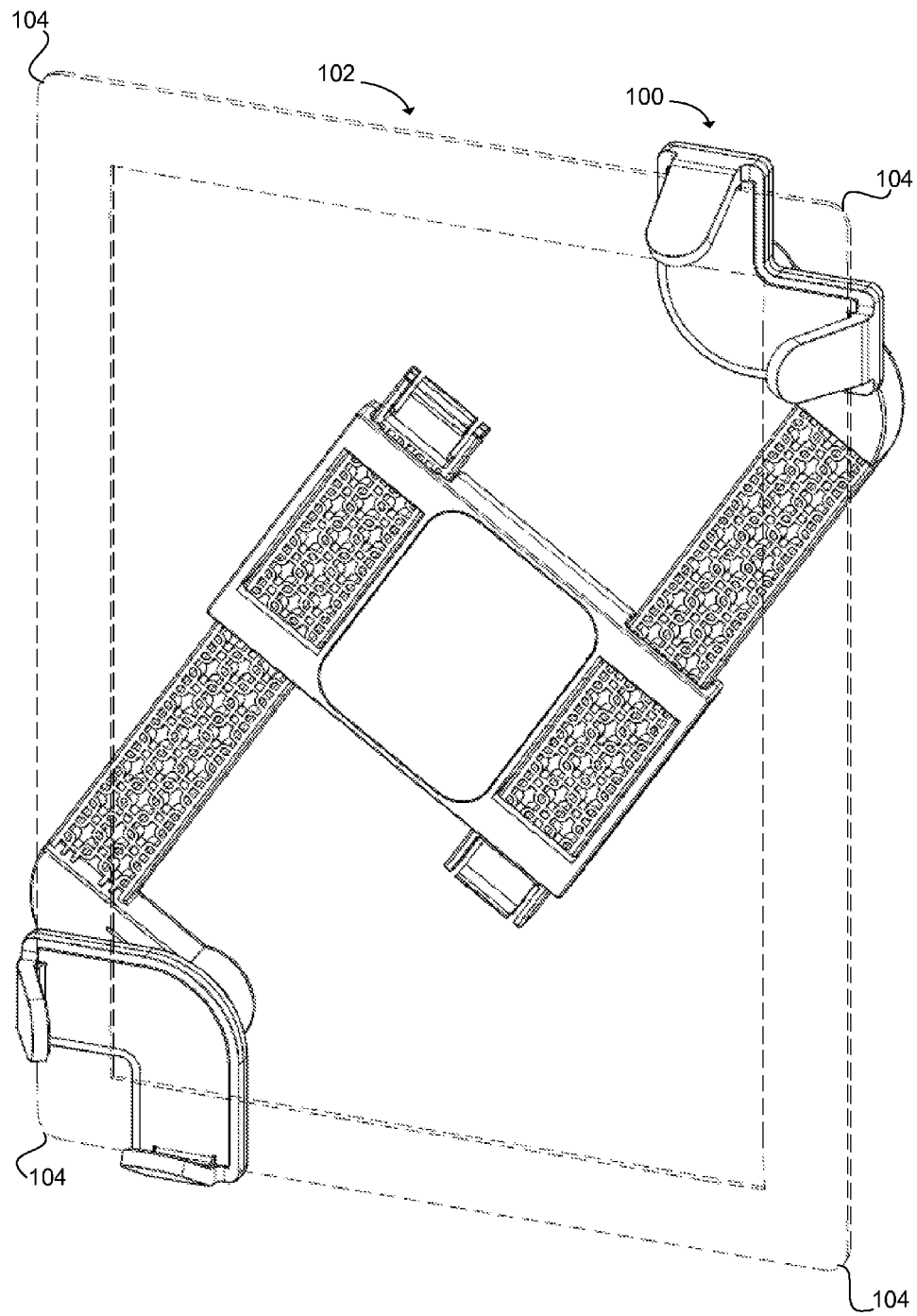
FIG. 1A illustrates an environmental perspective view of an adjustable holder for devices with an example device held therein.

Referring to FIG. 1A, there is illustrated an adjustable holder for devices 100 (sometimes referred to herein simply as an "adjustable holder" 100) according to an example embodiment. As shown in FIG. 1, the adjustable holder 100 is configured to hold a device 102 by gripping the device 102 at opposing corners 104. The adjustable holder 100 is adjustable in order to accommodate various types of devices 102 such as tablets (e.g., the iPad®), notebook/laptop computers, e-readers (e.g., the Kindle®), smart phones (e.g., the iPhone®), digital picture frames, global positioning system (GPS) devices, televisions, or any similar type of device (hereafter "device" 102) that is generally flat. The various types of aforementioned devices 102 can have a variety of form factors and shapes or geometries. That is, some devices 102 tend to have a relatively square geometry with sides of approximately equal length, while other devices 102 tend to have more rectangular geometries with adjacent sides of different lengths. Other devices may have more circular shapes or unorthodox geometries. The adjustable nature of the adjustable holder 100 allows the adjustable holder 100 to accommodate many different types of devices 102 with varying form factors and shapes.

Figure 1B:
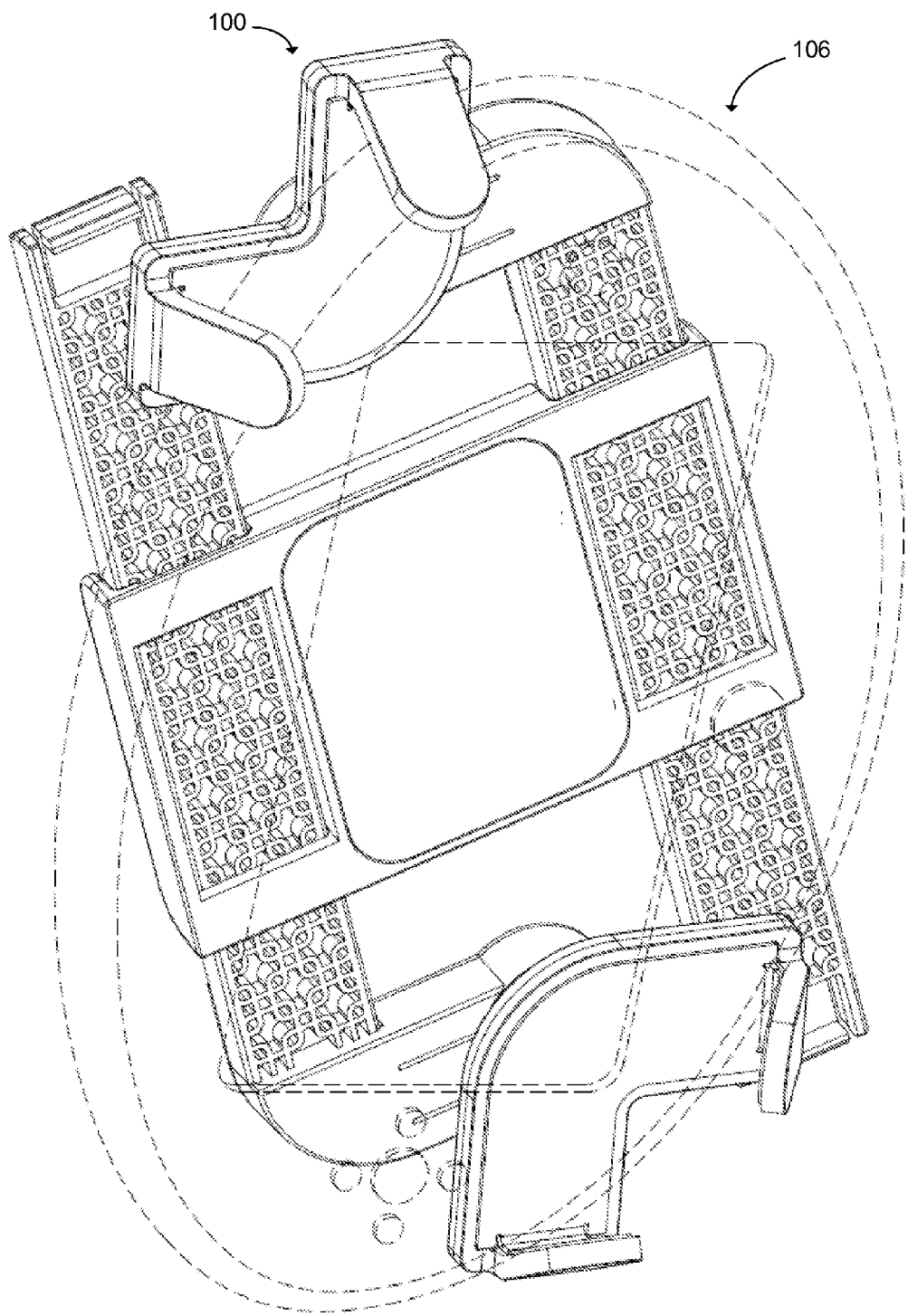
FIG. 1B illustrates an environmental perspective view of the adjustable holder of FIG. 1A with another example device of a different shape held therein.

Referring now to FIG. 1B, there is illustrated the adjustable holder 100 holding a device 106 of a circular shape. Accordingly, the adjustable holder 100 is configured to hold the device 106 by gripping the device 106 at opposing sides. Thus, the adjustable holder 100 is able to hold either device 102 or 106 in a similar manner by gripping the devices 102, 106 at opposing sides of the devices 102, 106, which may include corners 104 in the case of a rectangular-shaped device, such as device 102.

Figure 2:
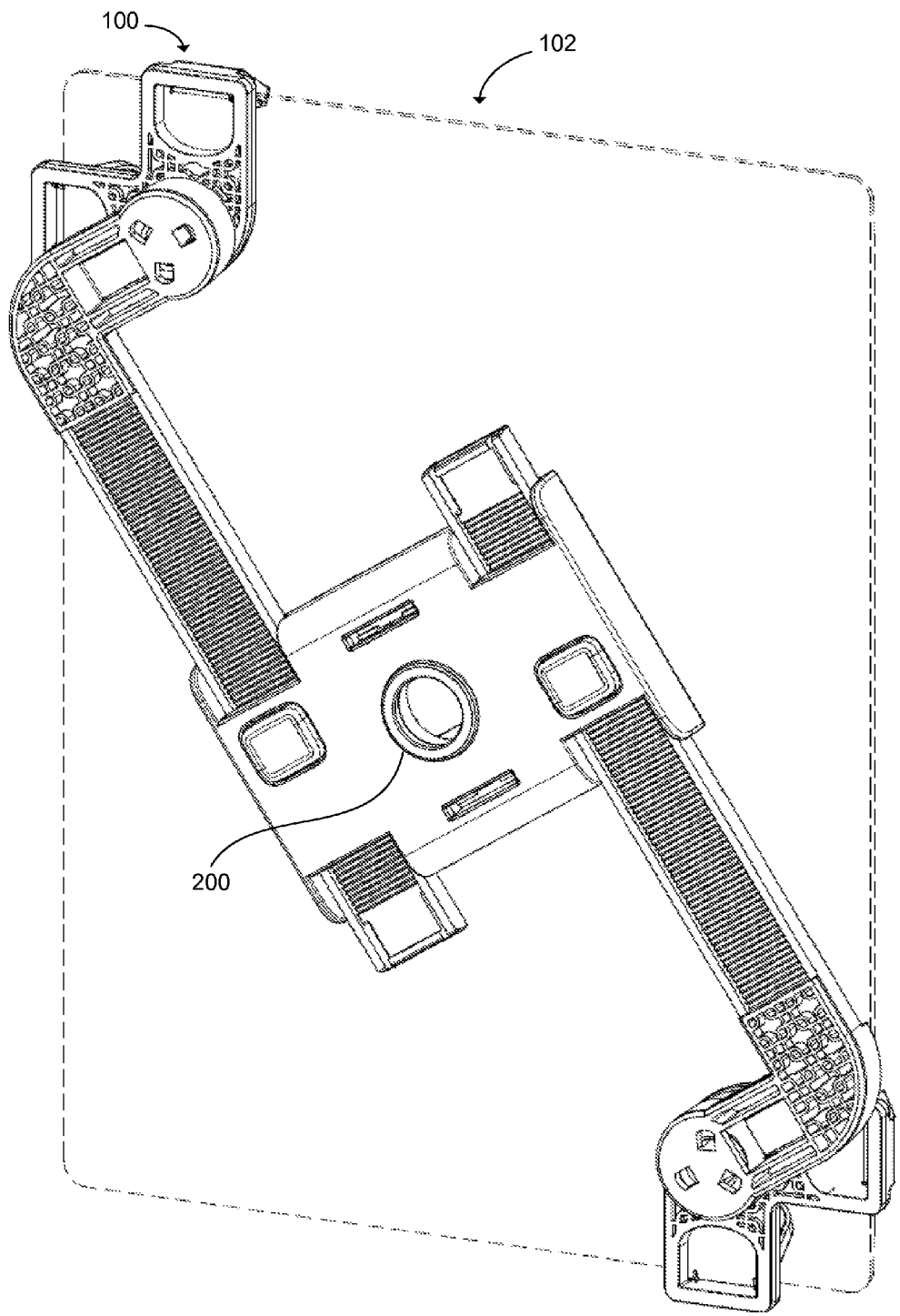
FIG. 2 illustrates an environmental perspective view of an adjustable holder for devices as viewed from the backside of a device held by the adjustable holder.

FIG. 2 illustrates a perspective view of the adjustable holder 100 as viewed from a backside of the device 102 held by the adjustable holder 100. As shown in FIG. 2, the adjustable holder 100 comprises a mounting mechanism 200 for mounting the adjustable holder 100 onto a stand or similar structure such that the device 102, 106 can be oriented in three-dimensional (3D) space into various suitable positions for using the device in a "hands-free" mode of operation. As used herein, a "hands-free" mode of operation for the device 102, 106 means that a user is not limited by having to use one or more hands to hold or support the device 102, 106 while using the device 102, 106. As a consequence, the user has at least one more "free" hand at their disposal to operate the device 102, 106, or to help the user do something else. In some embodiments, the mounting mechanism 200 comprises a female ball mount, or socket, to mount onto a corresponding male ball mount, or ball, disposed on a stand or similar structure suitable for positioning the device 102, 106 at varying heights and orientations in 3D space. Accordingly, the adjustable holder 100 and mounting mechanism 200 may allow a rectangular-shaped device, such as the device 102, to be oriented in a landscape configuration (i.e., longer sides of the device 102 are substantially parallel to the ground) or a portrait configuration (i.e., shorter sides of the device 102 are substantially parallel to the ground), or any position in between landscape and portrait configurations.

Figure 3:
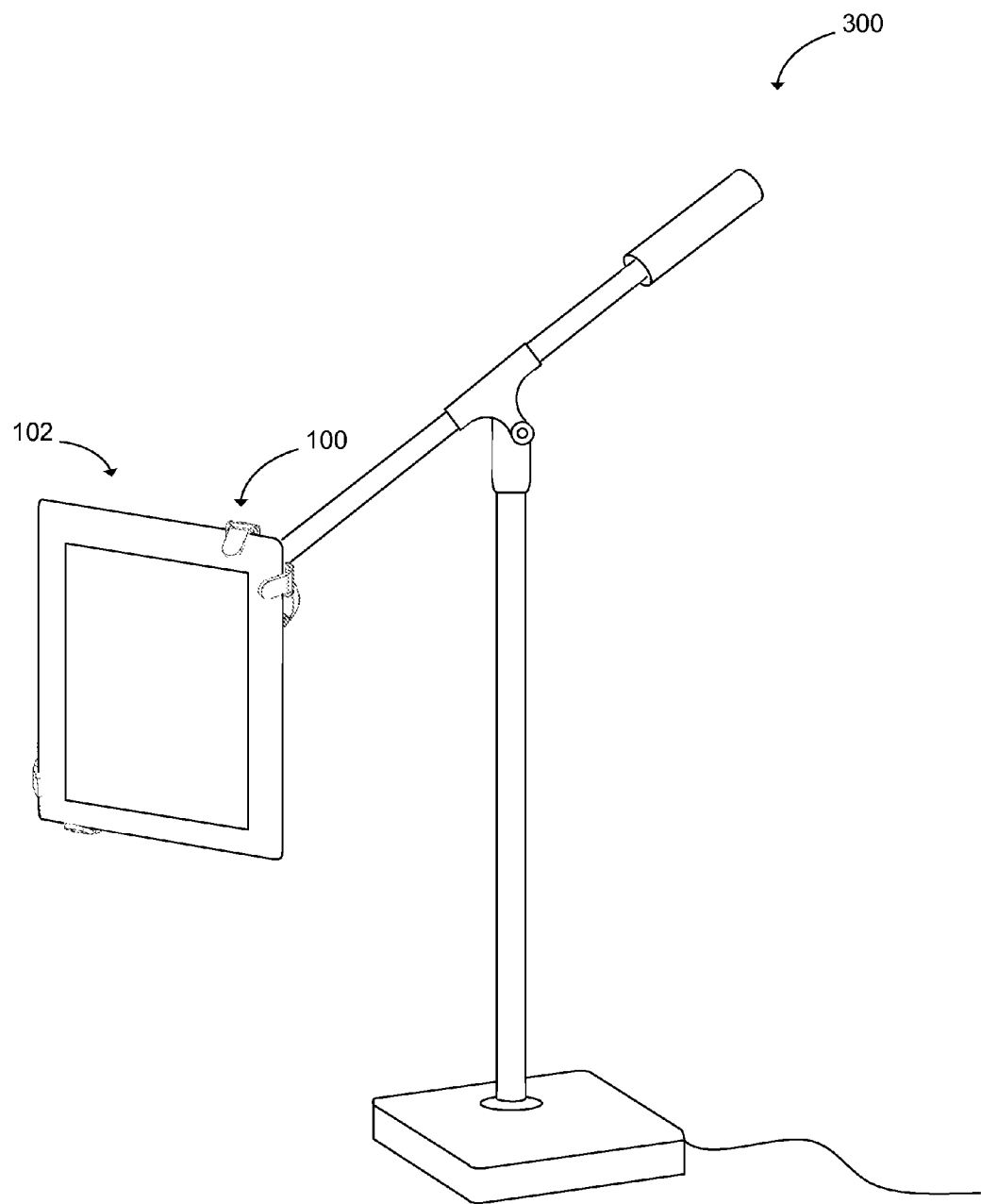
FIG. 3 illustrates an environmental view of an adjustable holder for devices when mounted on a structure.

Referring now to FIG. 3, there is illustrated the adjustable holder 100 mounted on a structure 300, such as a stand. The structure 300 may be relatively tall in order to position the device 102, 106 at approximately the height of a person in a standing position, and the structure 300 may be adjustable to higher or lower heights. In some scenarios, the structure 300 may be configured to fixedly mount to a relatively flat surface, like a table, or a dashboard of an automobile. In such scenarios, the structure 300 may be substantially smaller to the structure shown in FIG. 3 which is generally comparable in size to a standard music stand. Various types and configurations of structures 300 may be used in different settings to enable versatile use of the device 102, 106 by an end user.

Although the mounting mechanism 200 is shown in FIG. 2 as comprising a socket of a ball-and-socket mount, it is to be appreciated that the ball and socket could be switched between the adjustable holder 100 and the structure/stand. It is also to be appreciated that any suitable type of mounting mechanism 200 may be utilized with the adjustable holder 100 without changing the basic characteristics of the system. For instance, other suitable types of mounting mechanisms 200 may include, but are not limited to, screw mounts, bolted mounts, lock and pin mounts, clamps, interference sliding mounts, and the like. In some embodiments, the adjustable holder 100 may not include a mounting mechanism 200, the adjustable holder 100 instead being integral with a stand or the structure 300 configured to position the device 102, 106 disposed in the adjustable holder 100 at various heights and orientations.

Figure 4:
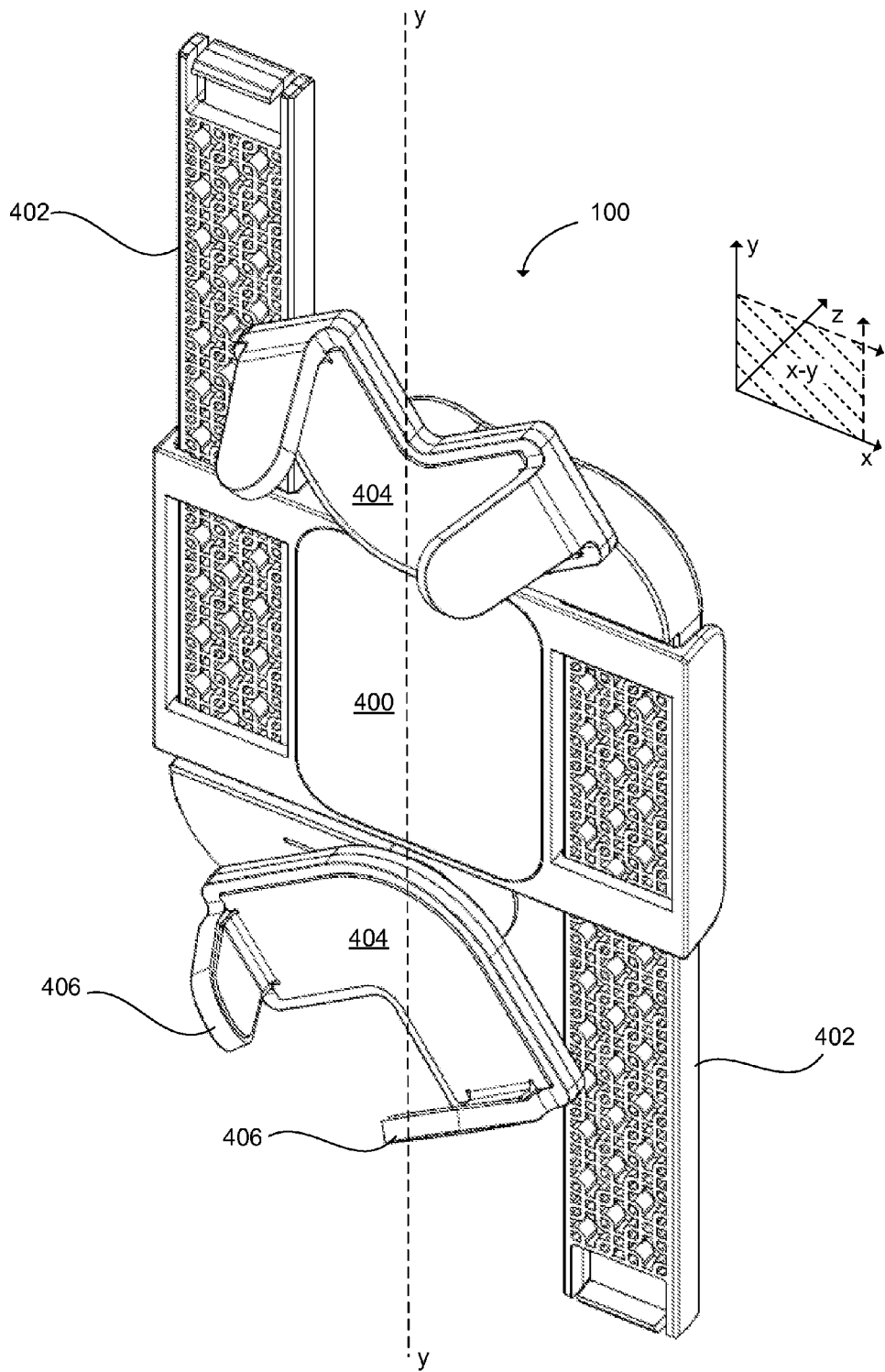
FIG. 4 illustrates a perspective view of an adjustable holder for devices in a substantially collapsed/contracted configuration.

FIG. 4 illustrates a perspective view of the adjustable holder 100 in a collapsed or contracted configuration according to embodiments disclosed herein. As shown in FIG. 4, the adjustable holder 100 includes a support 400 comprising at least two openings (described and shown in more detail with reference to FIG. 6, below) disposed on opposing sides of the support 400. Each opening in the support 400 is configured to receive an arm 402 in sliding engagement. FIG. 4 shows two arms 402 that may be identical, and are adjustable relative to the support 400 by sliding translation of the arms 402 within the openings of the support 400. By providing at least two arms 402, the adjustable holder 100 is able to grasp a device 102, 106 therein at two opposing sides of the device 102, 106. This two-arm configuration allows the device 102, 106 to be centered around a center of mass of the device 102, 106, enabling balanced movement and adjustment around the mounting mechanism 200, such as a ball-and-socket join, regardless of the geometry of the device 102, 106. However, it is to be appreciated that more than two arms 402 may be provided in order to grasp additional sides, corners or edges of the device 102, 106 which may provide a more secure configuration. Still, embodiments with two arms 402, like the embodiment shown in FIG. 4, are sufficiently secure to hold a device 102, 106 without significant risk of dropping, or otherwise losing a grip on, the device 102, 106.

Figure 5:
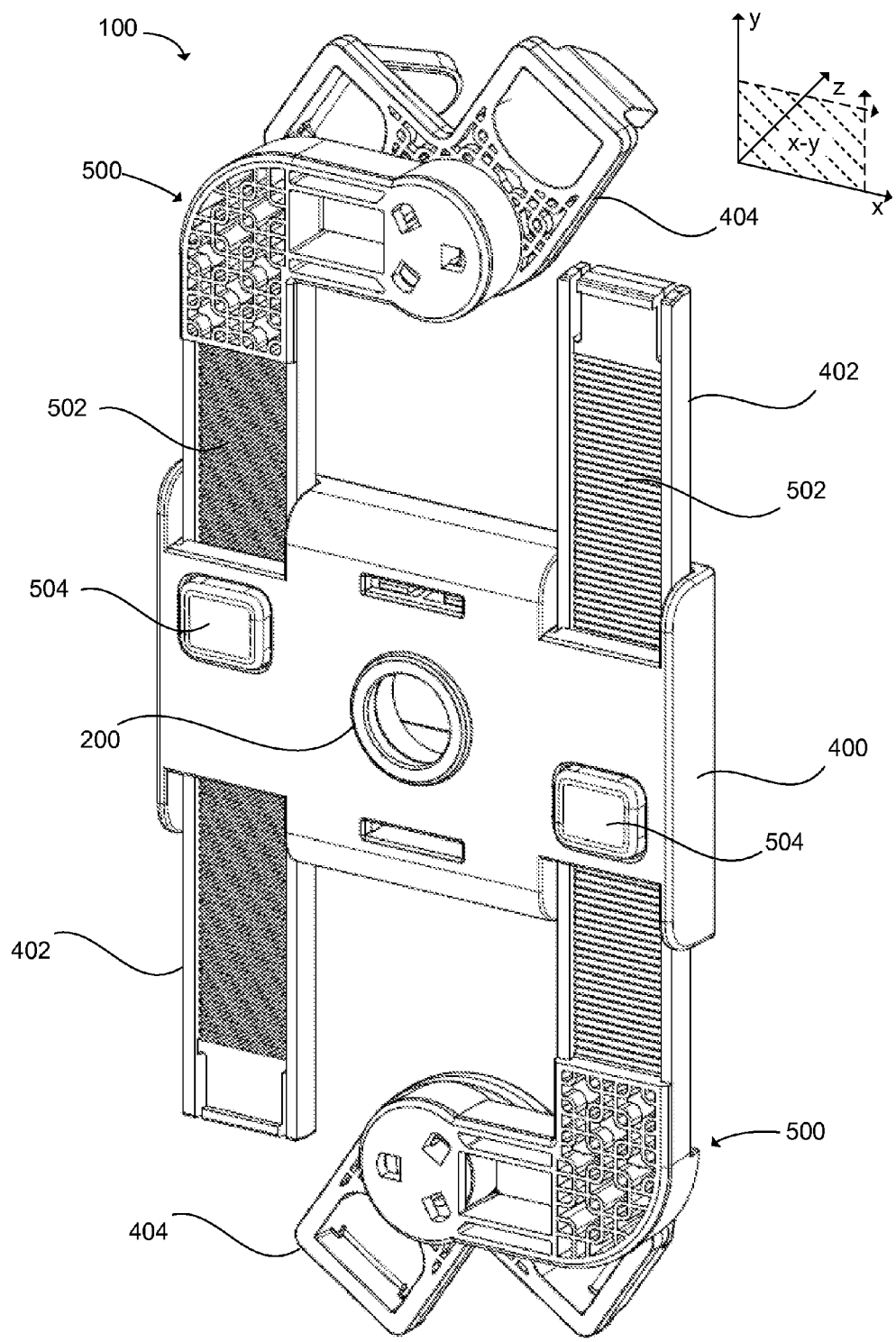
FIG. 5 illustrates a perspective view of an adjustable holder for devices as viewed from a backside of the adjustable holder, with the adjustable holder in a partially expanded/extended configuration.

In some embodiments, the arms 402 are generally L-shaped, as illustrated in FIG. 5. The L-shaped configuration of the arms 402 causes a reactionary force of the device 102, 106 upon the adjustable holder 100 to be aligned down a center (centerline y-y) of the support 400. By aligning the force exerted on the adjustable holder 100 along the center of the support 400, the adjustable holder 100 remains stable while holding the device 102, 106. Without such alignment, the device 102, 106 may tend to rotate and fall out of the grasp of the adjustable holder 100.

As shown in the embodiment of FIG. 4, the arms 402 are oriented generally parallel to each other with reference to the y-axis of the coordinate reference. FIG. 4 also shows the arms 402 as being oriented generally flat on a common plane, such as the x-y plane of the coordinate reference, as well as offset from one another on that common plane (i.e., x-y plane) in a direction transverse to the direction of the sliding engagement of the arms 402 (i.e., offset along the x-axis).

In some embodiments, the arms 402 are adjustable relative to the support 400 by the use of a two-part ratcheting mechanism that allows the arms 402 to be translated within the openings of the support 400 and fixedly positioned at different points along the y-axis of the coordinate reference. The two-part ratcheting mechanism will be described in more detail below with reference to FIGS. 7B and 8A through 8C. In general, at least one part of the two-part ratcheting mechanism is configured to releasably engage the other part of the two-part ratcheting mechanism to enable the adjustable translation of either or both of the arms 402 relative to the support 400. This enables a user to securely place the device 102, 106 within the adjustable holder 100 for hands-free use of the device 102, 106 such that the adjustable holder 100 clamps down onto and around the device 102, 106 to securely hold the device 102, 106 therein. The two-part ratcheting mechanism also allows the user to remove the device 102, 106 from the adjustable holder 100 when hands-free use is no longer needed or desired.

As further illustrated in FIG. 4, the adjustable holder 100 further comprises gripping members 404 that are coupled to a distal end of each of the arms 402. In some embodiments, the distal end may be the end of the arm 402 with the shorter of the two L-shaped sections. The gripping members 404 are configured to grip or grasp the device 102, 106 at opposing sides, which may include corners 104 in the case of a rectangular-shaped device, such as the device 102. In some embodiments, the gripping members 404 may comprise angled tabs 406 or hooks protruding from a main body portion of the gripping members 404. Each of these angled tabs 406 are designed to wrap around an edge of the device 102, 106 to securely grasp the device 102, 106 at a side of the device 102, 106, and sometimes around a corner 104 of the device 102 that is of a more rectangular shape. The angle of the angled tabs 406 should be in a range of 55 degrees (°) to 70° (described and shown in more detail with reference to FIG. 9B, below). In some embodiments, an optimal angle 60° is preferred so as to not impinge on the viewable area of the device 102, 106 and still hold/grasp the device 102, 106 securely. FIG. 4 shows two angled tabs 406 on each of the gripping members 404. This "two-tab" design allows the gripping member 404 to surround a corner 104 of a rectangular-shaped device, such as the device 102, and thereby securely hold the device 102 at opposing sides in a stable fashion. The "two-tab" design is also suitable for different shaped devices of unorthodox shapes, or devices that do not have corners, such as the device 106.

In some embodiments, the gripping members 304 are configured to rotate about an axis perpendicular to the x-y plane (i.e., about the z-axis) of the coordinate reference. By using rotatable gripping members 404, the adjustable holder 100 is able to accommodate devices 102, 106 of various geometries which may come in a variety of form factors and may have different aspect ratios.

Referring to FIG. 5, there is illustrated a perspective view of the adjustable holder 100 as viewed from a backside of the adjustable holder 100 according to embodiments disclosed herein. FIG. 5 shows the adjustable holder 100 in a partially extended configuration where the distal ends 500 of the arms 402 have been translated farther away from the support 400. This may be performed when attempting to secure a larger device 102, 106 in the adjustable holder 100, and is enabled via the aforementioned two-part ratcheting mechanism according to some embodiments. Specifically, a two-part ratcheting mechanism is shown in FIG. 5 as comprising a first ratcheting mechanism 502. In some embodiments, the first ratcheting mechanism comprises a plurality of teeth or similar features disposed on a side of the arms 402. The teeth may span substantially the entire width of the arm 402, or they may be of any suitable size shorter than the width of the arm 402 that facilitates engagement with a second ratcheting mechanism 504 of the two-part ratcheting mechanism. Additionally, or alternatively, the teeth may be disposed on other, or all, sides of the arm 402.

When adjusting the adjustable holder 100, a user may ratchet either or both of the arms 402 closer to the support 400 and toward a contracted/collapsed configuration by applying a force in a direction along the y-axis of the coordinate reference and from the distal end 500 of the arm 402 toward the support 400. In this scenario, the second ratcheting mechanism 504 does not need to be actuated, as the two-part ratcheting mechanism allows for unidirectional movement of each of the arms 402 in a direction toward the support. In order for the user to extend either or both of the arms 402 toward the extended configuration with the distal ends 500 of the arms 402 farther away from the support 400, the user can actuate the second ratcheting mechanism 504 of the two-part ratcheting mechanism in order to disengage the natural bias of the second ratcheting mechanism 504 for enabling translational movement of the arms 402 within the openings of the support 400. A notable aspect of the embodiments disclosed herein is that the adjustable holder 100 may be used in a "single-button release" fashion. That is, a user need only actuate/depress one of the second ratcheting mechanisms 504 (e.g., buttons) in order to disengage the adjustable holder 100 from holding the device 102, 106. It follows that a user may single-handedly release a device 102, 106 being held by the adjustable holder 100 by actuating one of the buttons to loosen the grip of one of the gripping members 404 on the device 102, 106, making the adjustable holder 100 simple to operate. Particularly, when inserting and/or removing the device 102, 106 subsequent to an initial adjustment of the arms 402 to securely hold the device 102, 106, one of the arms 402 may remain fixed in position (i.e., adjusted and fixed in position once initially) while the other arm 402 is adjusted to grasp/release the device 102, 106 upon insertion/removal of the device 102, 106.

FIG. 5 shows the second ratcheting mechanism 504 as a release mechanism, such as a button-release mechanism. When a user actuates the second ratcheting mechanism 504 by depressing it into the support 400 (i.e., along the z-axis of the coordinate reference), the second ratcheting mechanism 504 releases from a biased engagement with the first ratcheting mechanism 502 (e.g., teeth on the backsides of the arms 402) such that the arms 402 can slide freely and in bi-directional movement within the openings of the support 400 to adjust the position of the arms 402 relative to the support 400. When the user releases the second ratcheting mechanism 504, the second ratcheting mechanism 504 naturally biases toward engagement with the first ratcheting mechanism 502 to hold the arms 402 in a fixed position relative to the support 400.

Also illustrated in greater detail in FIG. 5 is the L-shape nature of the arms 402 according to some embodiments. FIG. 5 illustrates that the longer sections of the L-shaped arms 402 are slidingly received within the openings of the support 400, while the shorter sections of the L-shaped arms 402 are toward the distal end 500 of the arms 402 and are coupled to the gripping members 404.

It is to be appreciated that the specific dimensions, proportions, shapes and configurations of the adjustable holder 100 and each of the support 400, the arms 402 and the gripping members 404 are not specific to the embodiments disclosed herein. For example, the support 400 may be circular in geometry rather than rectangular, or it may be of any suitable shape. Furthermore, the adjustable holder 100 may be of various sizes for use in different settings with corresponding devices 102, 106 ranging in size. However, in a preferred embodiment, the adjustable holder 100 is configured to hold devices 102, 106 ranging in size from roughly the size of a conventional smart phone (roughly 5 inches×2.5 inches) to a large size tablet computer (roughly 9.5 inches×7.5 inches), and the maximum length from the distal end 500 of one arm 402 to the distal end 500 of the other arm 402 when the adjustable holder 100 is fully extended will be limited by the relative dimensions of the component parts of the adjustable holder 100 such that it can sustain deflection caused by forces exerted on the adjustable holder 100 from a device 102, 106 being held therein. Additionally, the adjustable holder 100 should be able to retain its fixed position under the influence of at least two pounds of force acting on either of the arms 402 in a direction parallel to the direction of sliding engagement with the support 400.

In some embodiments one or more of the support 400, the gripping members 404 and the second ratcheting mechanisms 504 may be made of plastic, such as molded plastic, or any other suitable material known in the art. Specifically, polycarbonate/acrylonitrile butadiene styrene (PC/ABS) plastic, or a suitable polymer-based ABS plastic may be used in the manufacturing of these component parts of the adjustable holder 100. Suitable materials generally may be semi-rigid/semi-elastic, relatively strong plastics that are resistant to impact, heat and stress. The arms 402 may be made of glass-filled (e.g., 10%-13% glass-filled nylon) nylon, or any suitable material. In general, the adjustable holder 100 should accommodate a minimum deflection of roughly 0.06 inches (1.5 millimeters) of the arms 402 relative to the support 400 when used to hold a device 102, 106 therein. Thus, the material should have some elasticity to enable such a deflection.

Additionally, the gripping members 404 may include a soft rubber surface material on at least portions of the gripping members 404 that interface with, or contact, the device 102, 106. In these embodiments, the soft rubber surface helps to protect the device 102, 106 from abrasive damage, and also helps to create a firm grasp on the device 102, 106 due to the relatively high coefficient of friction of soft rubbers. In embodiments disclosed herein, an optimal hardness of the rubber for the gripping members 404 is roughly 60 Shore A on the Durometer scale. However, the soft rubber may be any suitable rubber material that is generally soft enough to deform, but hard enough to keep its shape.

In some embodiments, one or more of the support 400, the arms 402, the gripping members 404, and the second ratcheting mechanisms 504 may be manufactured using an injection molding technique, the process for which should be apparent to a person having ordinary skill in the art. Particularly, simplified injection molding techniques that do not require lifters or slides may be used to manufacture the component parts of the adjustable holder 100 according to embodiments disclosed herein. As a result, relatively inexpensive, simple tooling comprising a core and a cavity may be used to manufacture the component parts of the adjustable holder 100 with minimal waste material resulting from the manufacturing process.

Figure 6:
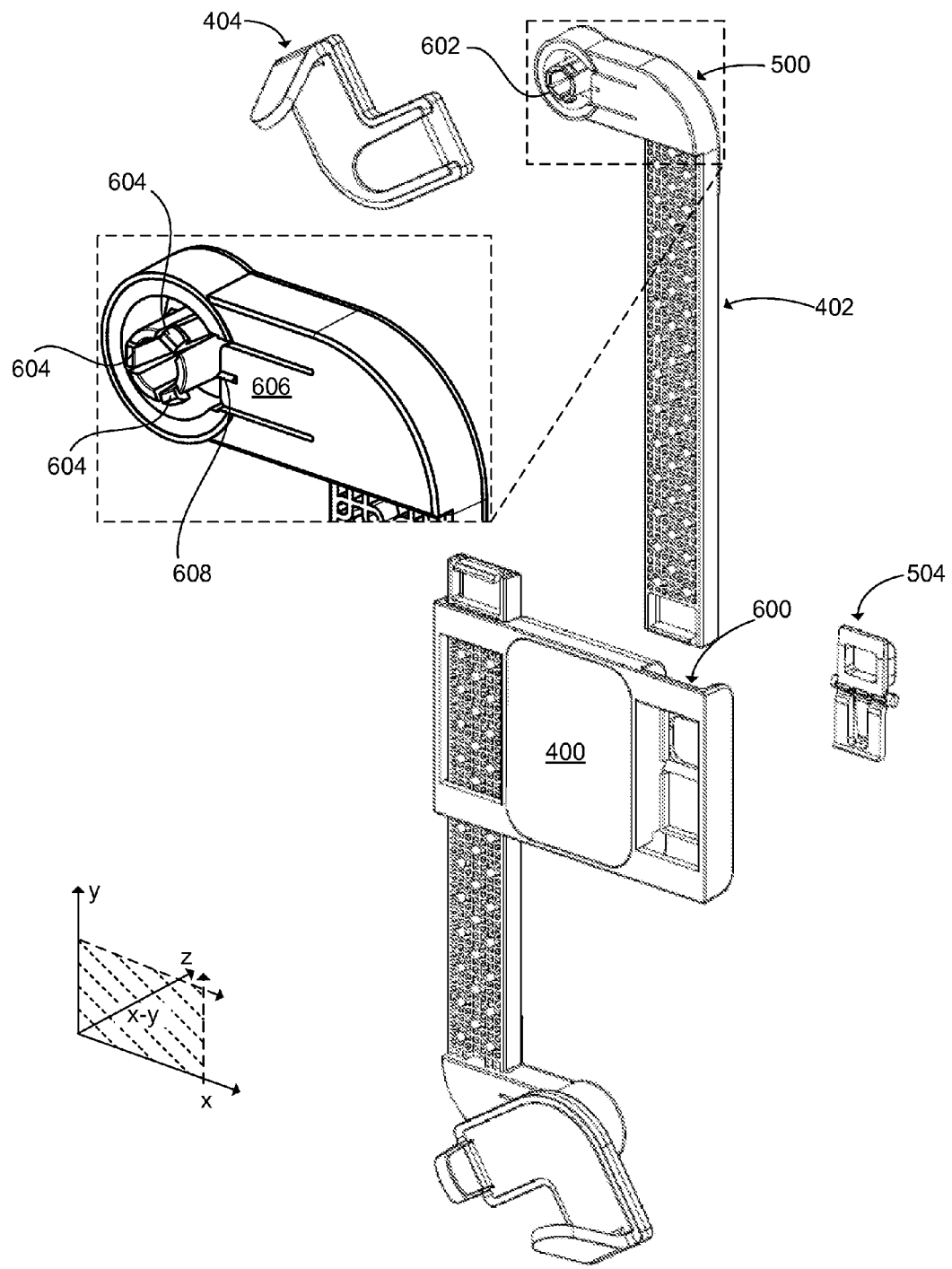
FIG. 6 illustrates a partially exploded, perspective view of an adjustable holder for devices showing an arm, a gripping member and one part of a two-part ratcheting mechanism exploded from a support of the adjustable holder.

FIG. 6 illustrates a partial exploded, perspective view of the adjustable holder 100 according to embodiments disclosed herein, showing an arm 402, a gripping member 404 and a second ratcheting mechanism 504 exploded from a support 400 of the adjustable holder 100. FIG. 6 illustrates, in greater detail, one of the openings 600 of the support 400. The opening 600 is configured to receive the arm 402 in sliding engagement such that the arm 402 may be coupled to the support 400 via the sliding engagement and translated through the opening 600 to adjust the arm 402 into various positions relative to the support 400. In some embodiments, such as the configuration shown in FIG. 6, the opening 600 in the support extends through the entire support 400 to the opposite side of the support 400 such that the opening 600 comprises a through hole. In this embodiment, one arm 402 is configured to be inserted through the opening 600 from the top side of the support 400, while the other arm 402 is configured to be inserted through the bottom side of the support 400 and within a similar opening on the bottom side of the support 400. Accordingly, when the opening 600 comprises a through hole, the arm 402 designed to be inserted from one side of the support 400, but not the other side of the support 400. In some embodiments, the opening 600 may not be a through hole, and accordingly may be close-ended such that the arm 402 may be received in the opening 600 perhaps until the arm 402 abuts an interior wall of the support 400.

FIG. 6 further illustrates an attachment mechanism 602 disposed on the distal end 500 of the arm 402 and configured to couple the arm 402 to the gripping member 404. In some embodiments, the attachment mechanism 602 enables rotation of the gripping member 404 about the z-axis of the coordinate reference in FIG. 6. By enabling rotation of the gripping member 404, the adjustable holder 100 is able to accommodate devices 102, 106 of different geometries. As shown in the close up view of the short section of the arm 402, the attachment mechanism 602 comprises a cylindrical structure including a plurality of radially positioned projections 604 spaced around a circumference of the cylindrical structure. Three projections 604 are shown in FIG. 6, but more or less projections 604 may be provided without changing the basic characteristics of the system. Accordingly, the attachment mechanism 602 is configured to couple to the gripping member 404 by snap fitting the gripping member 404 over the cylindrical structure of the attachment mechanism 602. Once the gripping member 404 is snap fit over the attachment mechanism 602, the gripping member 404 may rotate about the z-axis of the coordinate reference.

The close up view of the short section of the arm 402 further illustrates a diving board 606 comprising a wedge 608 or tooth-like projection disposed near the end of the diving board 606. When the gripping member 404 is coupled to the arm 402 via the attachment mechanism 602, ridges on the underside of the gripping member 404 engage with the wedge 608 to keep the gripping member 404 in a fixed rotational position. When the gripping member 404 is rotated, the translation of the ridges on the underside of the gripping member 404 impose a force on the wedge 608 and cause the diving board 606 to deflect or flex in a direction away from the gripping member 404, allowing the ridges to pass over the wedge 608 such that the diving board 606 springs back into fixed engagement with the ridges on the underside of the gripping member 404. In this fashion, the diving board 606 and wedge 608 arrangement acts as a detent for the rotational movement of the gripping member 404 such that the rotation of the gripping member 404 is divided into discrete, notched increments. This detent feature for the rotational movement of the gripping member 404 allows for easier insertion and removal of a device 102, 106 within the adjustable holder 100 such that the angular setting configured by the user to correlate with an aspect ratio of the device 102, 106 is maintained.

Figure 7A:
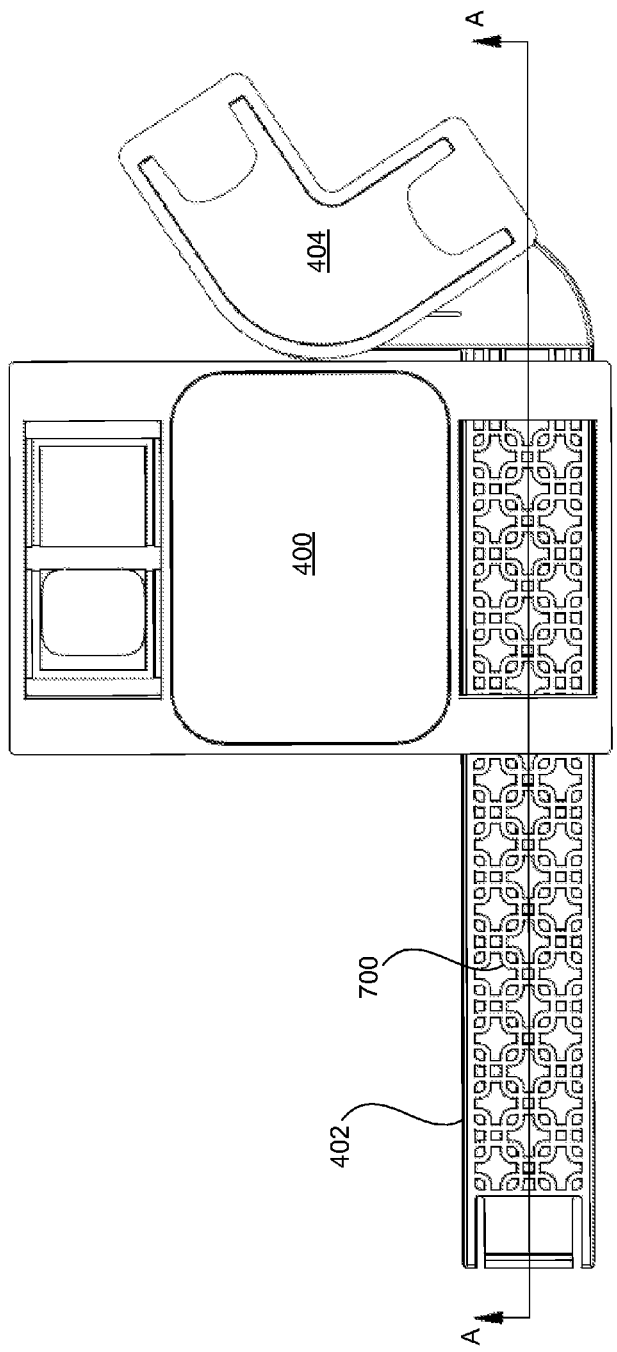
FIG. 7A illustrates a front view of an adjustable holder for devices with one arm shown for illustrative purposes.
Figure 7B:
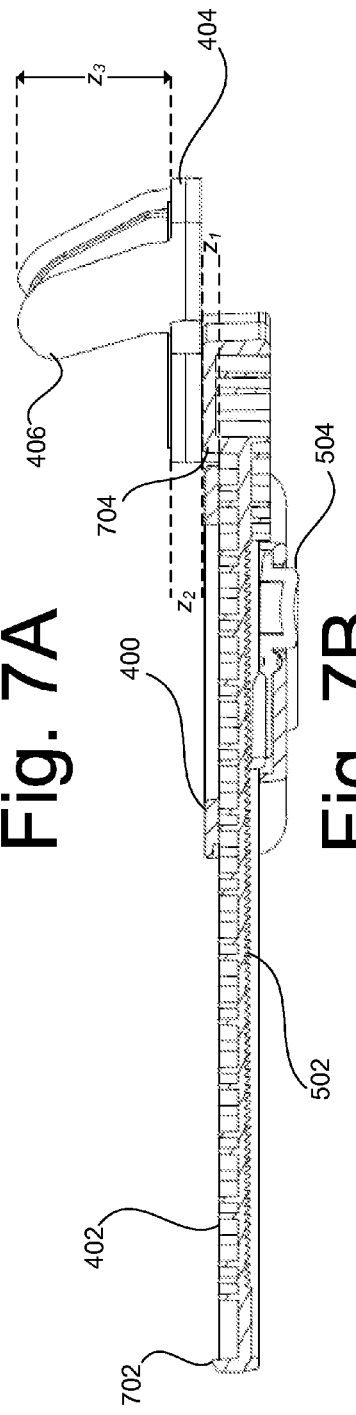
FIG. 7B illustrates a side, cross-sectional view of the adjustable holder of FIG. 7A from section line A-A, showing details of a two-part ratcheting mechanism included in the adjustable holder.

Referring now to FIGS. 7A and 7B, the adjustable holder 100 is shown with one arm 402 for illustrative purposes. Specifically, FIG. 7A illustrates a front view of the adjustable holder 100. A ribbing structure 700 of the arm 402 can be seen in greater detail from the view of FIG. 7A. The ribbing structure 700 functions to reinforce the arm 402 for more strength while reducing the overall weight of the arm 402 by virtue of hollow portions throughout the ribbing structure 700. It is to be appreciated that the ribbing structure 700 can be of any form or design, such as a solid material with no hollow portions, simple cross beams, or some alternative design to the design shown in FIG. 7A.

FIG. 7B illustrates a side, cross-sectional view of the adjustable holder 100 of FIG. 7A from section line A-A, which illustrates the aforementioned two-part ratcheting mechanism included in the adjustable holder 100 according to an example embodiment. FIG. 7B shows the two-part ratcheting mechanism comprising the first ratcheting mechanism 502 and the second ratcheting mechanism 504. The first ratcheting mechanism 502 includes a plurality of teeth disposed on the back side of the arm 402 and is configured to enable adjustable translation of the arm 402 relative to the support 400 by releasable engagement with the second ratcheting mechanism 504. The second ratcheting mechanism 504 is shown in FIG. 7B in a biased position for engaging the first ratcheting mechanism 502 in order to hold the arm 402 fixedly in position relative to the support 400.

In some embodiments, a stop 702 or projection is included at the end of the arm 402 opposite the gripping member 404. When the arm 402 is translated toward a fully expanded position with the gripping member 404 at a maximum distance from the support 400, the stop 702 prevents the arm 402 from sliding any further in a direction toward the expanded position by virtue of its interference with the support 400. As a result, a user will not accidentally remove the arm 402 from the support 400 during operation of the adjustable holder 100. The stop 702 may include a ramped contour on the end of the arm 402 to facilitate assembly of the arm 402 within the support 400.

In some embodiments, the short section of the arm 402 is stepped up a distance "$z_1$" from the front face of the long section of the arm 402 by virtue of a step feature 704 on the arm 402. The step feature 704 on the arm 402 allows the gripping member 404 to "clear," or not interfere with, the support 400 when the gripping member 404 is rotated. In some cases, the gripping member 404 is to be rotated such that it overhangs the support 400, and the step feature 704 allows for such functionality.

FIG. 7B also illustrates that the thickness of the main body portion of the gripping member 404 creates a distance "$z_2$" between the device 102, 106 to be held in the adjustable holder 100 and the support 400. When a user operates the device 102, 106 held in the adjustable holder 100, the distance $z_2$ prevents the device 102, 106 from touching, or "clicking" against the support 400, which allows for quiet operation of the device 102, 106 within the adjustable holder 100.

In some embodiments, a height "$z_3$" of the tabs 406 is at a height suitable for holding a device 102, 106 with a thick, protective cover or case on the device 102, 106. An optimal height "$z_3$" for holding tablets, e-readers, and the like within conventional protective casings is roughly 1 inch.

Figure 8C:
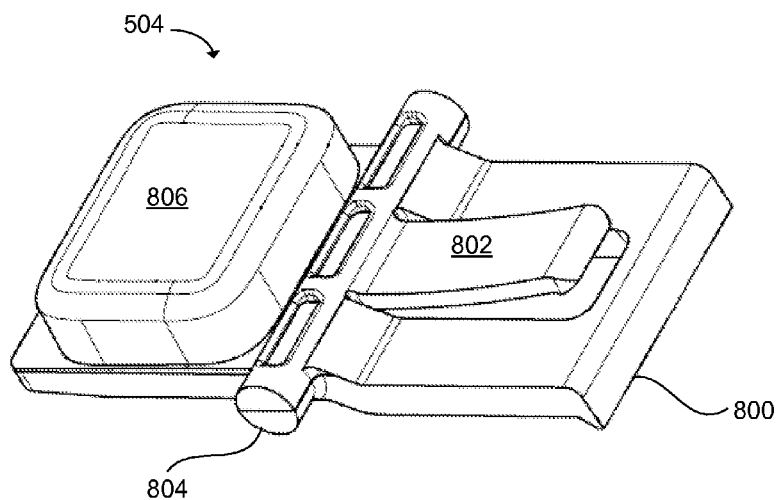
FIG. 8C illustrates a perspective view of an example second ratcheting mechanism of the two-part ratcheting mechanism for enabling adjustable translation of the arms of the adjustable holder.

Referring now to FIGS. 8A and 8B, a close-up of the side, cross-sectional view of the adjustable holder 100 of FIG. 7B is shown which illustrates the two-part ratcheting mechanism in multiple operational states. FIG. 8A illustrates that the second ratcheting mechanism 504 may comprise a spring-loaded pawl 800 or similar device to engage the first ratcheting mechanism 502, or teeth, disposed on the arm 402. The second ratcheting mechanism 504 may include a biasing member 802, such as a plastic spring, configured to bias the pawl 800 toward engagement with the first ratcheting mechanism 502. Movement of the pawl 800 toward the engagement position is facilitated by a fulcrum 804, or cantilever beam, shown in more detail below with reference to FIG. 8C. When a user actuates a button 806 of the second ratcheting mechanism 504 disposed on one side of the fulcrum 804 such as by physically depressing the button 806 into/toward the support 400, the pawl 800 disengages the first ratcheting mechanism 502, as shown in FIG. 8B, where the biasing member 802 is flexed closer to the pawl 800 until the pawl 800 substantially abuts an inner surface of the support 400 where it can no longer move about the fulcrum 804. Accordingly, the second ratcheting mechanism 504 only allows for translational/sliding movement of the arm 402 in one direction when the button 806 is not actuated by a user. The direction of unrestricted movement enables adjustment of the gripping members 404 toward a device 102, 106 in order to grasp the device 102, 106 more firmly. Furthermore, by restricting movement of the arms 402 in the opposite direction (i.e., toward the expanded/extended configuration), the adjustable holder 100 will be prevented from losing its grasp on an enclosed device 102, 106 and possibly dropping the device 102, 106.

Referring to FIG. 8C, an example second ratcheting mechanism 504 is illustrated in isolation from a perspective view. As illustrated, the biasing member 802 is naturally stable when it is displaced angularly from the pawl 800 such that a reactionary force exerted from the support 400 onto the biasing member 802 causes the pawl 800 to engage the first ratcheting mechanism 502, or teeth, disposed on the arm 402 in a stable state. As previously mentioned, the fulcrum 804 may be in the form of a cantilever beam, as shown in FIG. 8C. This cantilever allows the pawl 800 to move from an engaged position to a disengaged position relative to the first ratcheting mechanism 502 upon actuation of the button 806.

Figures 9A, 9B:
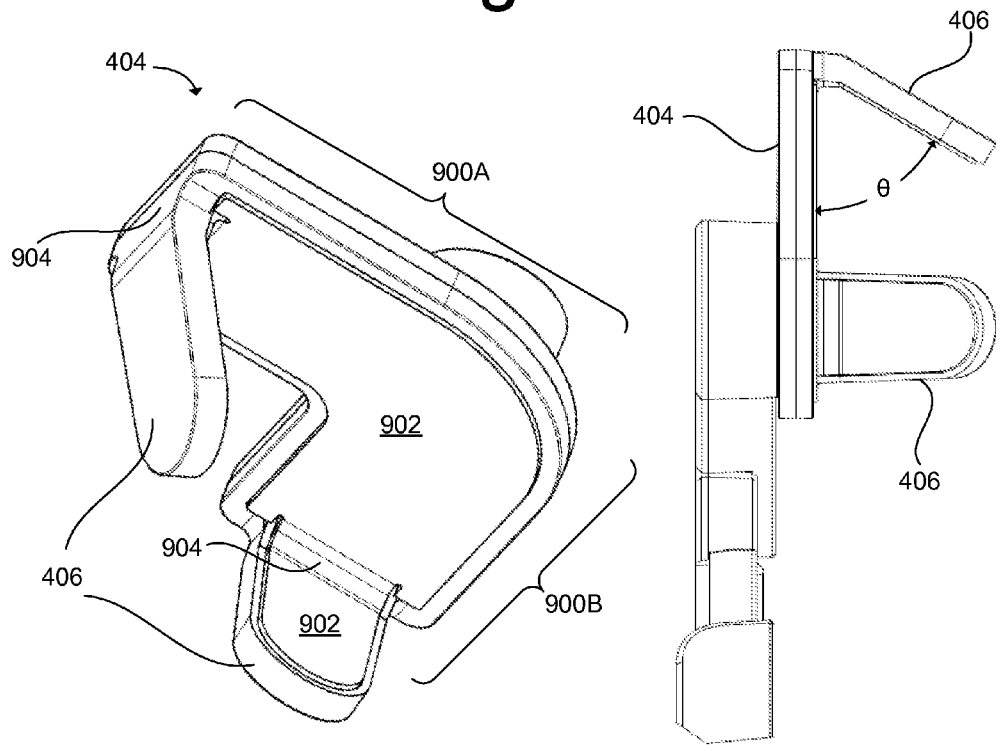
FIG. 9A illustrates an example gripping member of an adjustable holder for gripping a device at opposing sides of the device.
FIG. 9B illustrates a side view of the example gripping member of FIG. 9A.

FIGS. 9A and 9B illustrate an example gripping member 404 of the adjustable holder 100 configured to grip/grasp a device 102, 106 at opposing sides of the device 102, 106. As previously mentioned, the gripping member 404 may comprise a main body portion that is generally L-shaped with substantially equal sections 900A and 900B. As shown in FIG. 9B, the gripping member 404 may further comprise the aforementioned angled tabs 406 protruding at an angle θ from the main body portion at the end of corresponding ones of the substantially equal sections 900A/B such that the angled tabs 406 are oriented roughly 90° from one another and configured to wrap around edges of the device 102, 106 at a side, and when applicable, around a corner 104, to securely grasp the device 102, 106. As previously mentioned, the angle θ should be in a range of 55° to 70°. In some embodiments, an optimal angle θ of 60° is preferred so as to not impinge on the viewable area of the device 102, 106 and still hold/grasp the device 102, 106 securely.

In some embodiments, the gripping member 404 includes a surface portion 902 or layer of material where the gripping member 404 predominantly contacts the device 102, 106, as shown in FIG. 9A. The surface portion 902 may be made of soft rubber material which helps to protect the device 102, 106 from abrasive damage, and also helps to create a firm grasp on the device 102, 106 due to the relatively high coefficient of friction of soft rubbers. In embodiments disclosed herein, an optimal hardness of the rubber for the surface portion 902 is roughly 60 Shore A on the Durometer scale. However, as previously mentioned, the soft rubber may be any suitable rubber material that is generally soft enough to deform, but hard enough to keep its shape.

In some embodiments, junctions 904 between a main body portion of the gripping member 404 and the tabs 406 of the gripping member 404 are formed of a solid junction such as those formed by injection molding techniques, welding, and the like. Yet, in other embodiments, the junctions 904 may be hinged junctions allowing movement of the tabs 406 about the junctions 904 such that the tabs 406 may be positioned roughly 90° from the flat, planar surface of the main body portion of the gripping member 404 when the gripping member 404 is not holding a device 102, 106, and may be moved to the angle θ (roughly 60°), and possibly locked in position, when holding the device 102, 106.

Although the present invention has been described in relation to particular embodiments thereof, many other variations and modifications and other uses will become apparent to those skilled in the art. Therefore, the present invention should be limited not by the specific disclosure herein, but only by the appended claims.

What is claimed is:

1. An adjustable holder comprising:
 a support comprising at least two openings disposed on opposing sides of the support, a centerline of the support running from one of the opposing sides to another one of the opposing sides, wherein the at least two openings are disposed on opposite sides of the centerline of the support;
 at least two adjustable arms, each comprising:
  a first section in sliding engagement within a corresponding opening of the at least two openings; and
  a second section coupled to the first section at a distal end of the adjustable arm,
  wherein:
   the first section and the second section are oriented to form an L-shape within a common plane of the at least two adjustable arms, and
   the first section of one of the at least two adjustable arms is: (i) oriented generally parallel to the other first section and generally parallel to the centerline of the support, and (ii) offset from the other first section on the common plane in a direction transverse to a direction of the sliding engagement such that the first sections of the at least two adjustable arms are disposed on opposite sides of the centerline of the support; and
 a gripping member coupled to the distal end of each of the at least two adjustable arms, the gripping member being rotatable about an axis perpendicular to the common plane.

2. The adjustable holder of claim 1, further comprising a two-part ratcheting mechanism configured to enable adjustable translation of either of the at least two adjustable arms relative to the support.

3. The adjustable holder of claim 2, wherein a first ratcheting mechanism of the two-part ratcheting mechanism comprises a plurality of teeth disposed on each of the at least two adjustable arms and configured to engage with a second ratcheting mechanism of the two-part ratcheting mechanism.

4. The adjustable holder of claim 3, wherein the second ratcheting mechanism comprises a cantilever release mechanism disposed within the support and biased in position to engage at least one of the plurality of teeth of corresponding ones of the at least two adjustable arms, the cantilever release mechanism being configured to disengage the at least one of the plurality of teeth of the corresponding adjustable arm upon actuation of the cantilever release mechanism to enable the adjustable translation of the corresponding adjustable arm.

5. The adjustable holder of claim 1, wherein the gripping member comprises:
 a main body portion; and
 at least two tabs protruding at an angle from the main body portion.

6. The adjustable holder of claim 5, wherein the angle is within a range of about 55 degrees to about 70 degrees.

7. The adjustable holder of claim 1, wherein the at least two openings comprise through holes allowing the at least two adjustable arms to pass completely through the support.

8. The adjustable holder of claim 1, wherein the support and the gripping member are made of molded plastic, and wherein the at least two adjustable arms are made of glass-filled nylon.

9. The adjustable holder of claim 1, wherein the gripping member comprises a rubber surface on a portion of the gripping member that is to contact a device.

10. The adjustable holder of claim 1, further comprising a detent for rotating the gripping member into various fixed rotational positions about the axis perpendicular to the common plane.

11. The adjustable holder of claim 1, wherein the support further comprises a mounting mechanism configured to mount the adjustable holder onto a structure and to orient the adjustable holder about a three-dimensional space.

12. The adjustable holder of claim 1, wherein the gripping member comprises:
 a main body portion; and at least two tabs protruding at an angle from the main body portion and oriented about ninety degrees from one another about the axis perpendicular to the common plane.

13. An adjustable holder comprising:
a support comprising at least two openings disposed on opposing sides of the support, a centerline of the support running from one of the opposing sides to another one of the opposing sides, wherein the at least two openings are disposed on opposite sides of the centerline of the support;
at least two arms, each comprising:
    a first section in sliding engagement within a corresponding opening of the at least two openings; and
    a second section coupled to the first section at a distal end of the arm,
wherein:
    the first section and the second section are oriented to form an L-shape within a common plane of the at least two arms, and
    the first section of one of the at least two arms is: (i) oriented generally parallel to the other first section and generally parallel to the centerline of the support, and (ii) offset from the other first section on the common plane in a direction transverse to a direction of the sliding engagement such that the first sections of the at least two arms are disposed on opposite sides of the centerline of the support; and
a gripping member coupled to the distal end of each of the at least two arms, the gripping member comprising:
    a main body portion; and
    at least two tabs protruding at an angle from the main body portion and oriented about ninety degrees from one another about an axis perpendicular to the common plane.

14. The adjustable holder of claim 13, wherein the gripping member coupled to the distal end of each of the at least two arms is rotatable about the axis perpendicular to the common plane.

15. The adjustable holder of claim 14, further comprising a detent for rotating the gripping member into various fixed rotational positions about the distal end of each of the at least two arms.

16. The adjustable holder of claim 13, wherein the angle is within a range of about 55 degrees to about 70 degrees.

17. The adjustable holder of claim 13, wherein the gripping member comprises a rubber surface on a portion of the gripping member that is to contact a device.

18. The adjustable holder of claim 13, wherein the first opening and the second opening comprise through holes allowing the at least two arms to pass completely through the support.

19. An adjustable holder comprising:
a means for supporting a device comprising at least two openings disposed on opposing sides of the means for supporting, a centerline of the means for supporting running from one of the opposing sides to another one of the opposing sides, wherein the at least two openings are disposed on opposite sides of the centerline of the means for supporting;
at least two means for expanding the adjustable holder, each comprising:
    a first section in sliding engagement within a corresponding opening of the at least two openings; and
    a second section coupled to the first section at a distal end of the means for expanding,
wherein:
    the first section and the second section are oriented to form an L-shape within a common plane of the at least two means for expanding, and
    the first section of one of the at least two means for expanding is: (i) oriented generally parallel to the other first section and generally parallel to the centerline of the means for supporting, and (ii) offset from the other first section on the common plane in a direction transverse to a direction of the sliding engagement such that the first sections of the at least two means for expanding are disposed on opposite sides of the centerline of the means for supporting; and
a means for gripping the device coupled to the distal end of each of the at least two means for expanding.

20. The adjustable holder of claim 19, wherein the first opening and the second opening comprise through holes allowing the at least two means for expanding to pass completely through the means for supporting.

* * * * *